United States Patent
Rasco et al.

(10) Patent No.: US 9,124,213 B2
(45) Date of Patent: Sep. 1, 2015

(54) METHOD AND APPARATUS FOR COOLING AND ENERGY CAPTURE IN AN ELECTRONIC DEVICE VIA A PHOTOVOLTAICS

(75) Inventors: Jacob Rasco, San Jose, CA (US); Joshua Een, Palo Allo, CA (US); Wim Crooijmans, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 708 days.

(21) Appl. No.: 12/709,153

(22) Filed: Feb. 19, 2010

(65) Prior Publication Data

US 2011/0203631 A1 Aug. 25, 2011

(51) Int. Cl.
| | |
|---|---|
| H01L 31/024 | (2014.01) |
| H01L 31/048 | (2014.01) |
| H02S 10/30 | (2014.01) |
| H02S 20/10 | (2014.01) |
| H02S 40/44 | (2014.01) |
| H01L 51/00 | (2006.01) |
| H01L 31/0216 | (2014.01) |
| H01L 31/0224 | (2006.01) |

(52) U.S. Cl.
CPC .............. *H02S 10/30* (2014.12); *H01L 31/024* (2013.01); *H01L 31/02167* (2013.01); *H01L 31/022425* (2013.01); *H01L 31/048* (2013.01)

(58) Field of Classification Search
CPC ............ H01L 31/024; H01L 31/02167; H01L 31/022425; H01L 31/048; H02S 10/30; H02S 20/10; H02S 40/44
USPC ............. 136/244, 256, 263, 252, 259; 257/40
See application file for complete search history.

(56) References Cited

U.S. PATENT DOCUMENTS

| | | | |
|---|---|---|---|
| 7,518,867 B2 | 4/2009 | Yazawa | |
| 7,572,396 B2 * | 8/2009 | Gaudiana et al. | 252/519.21 |
| 2010/0155575 A1 * | 6/2010 | Lundin | 250/206 |
| 2010/0206359 A1 * | 8/2010 | Evans | 136/247 |

* cited by examiner

*Primary Examiner* — Jayne Mershon
*Assistant Examiner* — Mayla Gonzalez Ramos
(74) *Attorney, Agent, or Firm* — Kilpatrick Townsend & Stockton LLP

(57) ABSTRACT

A method and apparatus for cooling and capturing energy in an electronic device using photovoltaic cells is disclosed. A power supply powers electronic components inside the electronic device. The electronic components produce heat and infrared energy. The photovoltaic cells convert the infrared energy into an electric current to reduce the overall heat level of the electronic device. A power recovery circuit conditions the electric current into a conditioned power signal usable by a system power path manager of the electronic device. The system power path manager uses the converted infrared energy to power the electronic device and/or to charge an energy storage unit.

24 Claims, 4 Drawing Sheets

METHOD AND APPARATUS FOR COOLING AND ENERGY CAPTURE IN AN ELECTRONIC DEVICE VIA A PHOTOVOLTAICS

TECHNICAL FIELD

The present disclosure relates in general to electronic devices, and, in particular, to methods and apparatus for cooling an electronic device and capturing energy in the electronic device using photovoltaics.

BACKGROUND

Electronic devices, such as mobile phones, personal digital assistants ("PDAs"), smartphones, laptops, netbooks, tablet computers, desktop computers, and various other handheld devices are performing at higher and higher levels. Electronic devices process more information than ever before, process information faster, and essentially provide an improved user experience. At the same time, electronic devices are generally becoming more compact over time, packing more components into smaller sized devices. This trend is particularly prominent with portable electronic devices. Moreover, a common theme with portable electronic devices is that users typically prefer devices that are compact and have a long battery life, which promotes simplified transporting of the device and ease of use in remote locations without requiring any connection to a power grid.

While users often prefer smaller devices with increased functionality and performance, there are some drawbacks to electronic devices of the prior art. The trend to make electronic devices more compact has caused high temperatures to be generated in smaller and smaller confined areas. As components are packed closer together, to fit into smaller device housings, there is less space for heat to dissipate from the components. Electronic components produce heat and infrared energy which are radiated from the components to their environment. If dissipated adequately, heat and infrared energy are not a problem for users of the electronic device. However, many electronic devices create an amount of heat and infrared energy that cannot always be dissipated adequately, which causes hot spots or warm areas on the device. This is particularly troublesome with portable electronic devices that are handled or carried by a user. These areas of noticeably increased temperature may be uncomfortable to users and might even be painful or harmful under certain circumstances. For example, a user may feel that a portable electronic device is uncomfortably warm when the device is in his hand, located by his ear, located in his pocket, or sitting on his lap.

The prior art methods of dealing with increased heat include various passive and active solutions. Passive solutions include heat distribution and throttling down performance or features of the electronic device. Heat distribution uses conduction of heat to various areas of the device, and can be used to maximize convective and radiated heat loss. By distributing the heat, the occurrence of hot spots is typically reduced, however, heat distribution is typically inadequate as the sole method of cooling the device.

Components in the electronic device can be throttled back or duty cycled to reduce their power consumption and associated heat generation. However, throttling back components decreases the performance of the device and/or reduces features available for the user to use. The decreased performance and features may be perceptible to the user and can deteriorate the user experience. Further, throttling devices down can add costs to the device, specifically, more expensive parts that are capable of throttling down and/or additional development time of the throttling protocol may be required.

Active solutions for removing heat include various cooling devices such as a fan, piezo vibrator, or Peltier cooler. Active solutions consume power, and thus, reduce battery time and/or overall efficiency of the device. Also, active solutions can have reliability issues, and may be an initial point of failure in a device that impedes a user's use of a device. For example, a cooling fan may become troublesome to a user, even while still cooling the device adequately, the cooling fan may produce noises that are unacceptable for using the device. Particularly for portable electronic devices, if an active solution uses significant amounts of power, reduced battery time may become a significant issue. A low battery life can seriously restrict a user's intended use of a device. Accordingly, using active solutions may require a larger capacity battery, which is typically more expensive and/or physically larger.

Accordingly, manufacturers of electronic devices face challenges in adequately cooling the devices and in prolonging battery life and/or increasing device efficiency. The prior art fails to provide a sufficient solution for the above described challenges.

SUMMARY

The present disclosure provides a new and innovative method and apparatus for cooling and energy capture in electronic devices. Specifically, the disclosure provides an electronic device with a power supply that powers electronic components inside the electronic device. The electronic components produce heat and infrared energy. A photovoltaic cell converts the infrared energy into an electric current to reduce the overall heat level of the electronic device. A power recovery circuit conditions the electric current into a conditioned power signal usable by a system power path manager of the electronic device. The system power path manager uses the converted infrared energy to power the electronic device and/or to charge an energy storage unit.

Additional features and advantages of the disclosed method and apparatus are described in, and will be apparent from, the following Detailed Description and the Figures.

DETAILED DESCRIPTION

Figure 1:
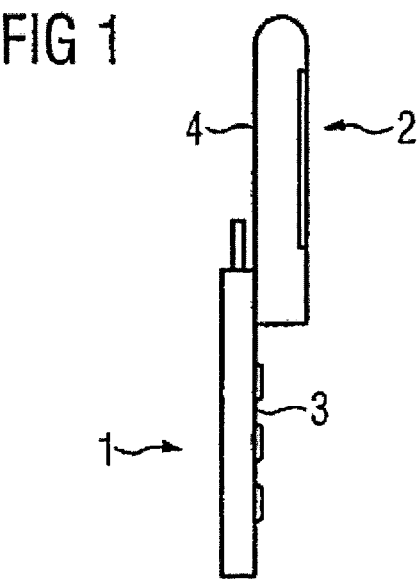
FIG. 1 is an illustration of an example electronic device.

An illustration of an example electronic device is shown in FIG. 1. The example electronic device illustrated is a mobile telephone that includes a first housing 1 and a second housing 2. The electronic device may have a keypad portion 3 and a speaker portion 4. The electronic device may be a sliding phone as shown in FIG. 1, sliding open to enable use of the keypad 3 on the first housing 1 and to expose the speaker portion 4 on the second housing 2, and sliding closed with the first housing 1 and the second housing 2 concealing the keypad 3 and the speaker portion 4. The components in the sliding phone may be configured in various ways, for example, with the majority of processing components and power supply components located in the first housing 1 and only a limited number of necessary components located in the second housing 2. It may be desirable to package a large number of the processing components in a relatively small space, such as the second housing 2. Such a configuration may be preferable for various reasons from a manufacturing and reliability standpoint.

Figure 2:
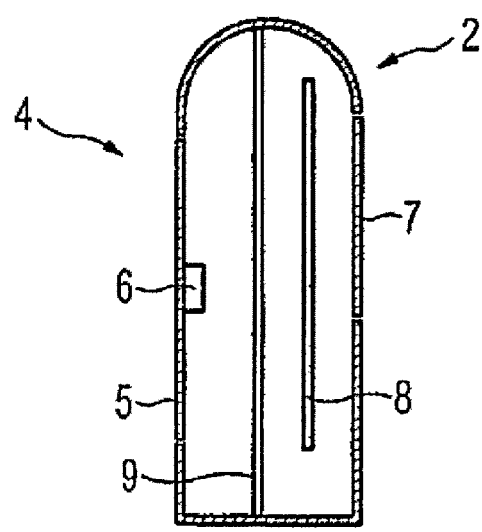
FIG. 2 is an illustration of an example electronic device housing.

An illustration of an example portable electronic device housing 2 is shown in FIG. 2. The illustrated second housing 2 shows the speaker portion 4 including a vibrating plate 5 and a piezo element 6. The second housing 2 also includes the display screen 7, which may be a liquid crystal display ("LCD") screen, a touch screen, and/or any other type of screen for displaying information to a user. The second housing 2 includes a circuit board 8, which includes the typical electronic components found on a circuit board in a mobile phone, including, for example, a microprocessor, power supply components, transmitter/receiver components. The second housing 2 includes a separating wall 9, which separates the housing into two separate chambers. In an example embodiment, the majority of the electronic components that generate heat and infrared energy are isolated in the chamber with the circuit board 8. For example, the circuit board 8 may include numerous processors, amplifiers, rectifiers, diodes, resistors, transistors, converters, etc., which may be packed tightly on the circuit board 8. In an example embodiment, the battery may also be included in the chamber with the circuit board 8 and the display screen 7. Accordingly, in an example embodiment with the display screen 7, the tightly packed circuit board 8, and the battery all located within the chamber created by chamber wall 9 and the housing wall of the second housing 2, there may be many heat and infrared energy producing components located within a relatively small space. A space used to house components in an electronic device may be considered "relatively small" when normal heat distribution techniques do not continually dissipate heat and infrared energy adequately for system operation and without creating any hot spots. In this example embodiment, simply using traditional techniques of heat dissipation may not adequately dissipate heat and infrared energy and eliminate hot spots. Accordingly, photovoltaic cells, or photovoltaics, may be used to capture infrared energy and cool the device.

As will be explained in greater detail below, photovoltaic cells may be applied to surfaces where heat is generated. For example, in areas of high heat concentration near the circuit board 8, photovoltaic cells are applied on the interior wall of the second housing 2 and the separating wall 9. Such an application of photovoltaic cells may be used to absorb infrared energy, which is then converted into an electric current, to decrease the level of heat in the device. The electric current may be used to recharge the battery or power components to extend battery life. Accordingly, the disclosed portable electronic device may simultaneously recover power lost as heat and cool the electronic components of the device.

Although, the functionality and features available on portable electronic devices can vary greatly, the example mobile phone illustrated in FIG. 1 and FIG. 2 represents a typical portable electronic device. However, the challenges of adequately cooling a device and also prolonging battery life and increasing device efficiency are applicable to many different types of electronic devices, including portable and non-portable. It should be appreciated that the example mobile phone discussed above, with electronic components packaged into a relatively small space, could be a flip phone or an open faced phone, or any other electronic device which may include one or more components packaged in a relatively small space. Photovoltaic cells may be used to cool and capture energy in various other kinds of electronic devices, for example, a personal digital assistant or PDA, a smartphone, a laptop, a netbook, a tablet computer, a desktop computer, a portable media player, a GPS navigation device, a rangefinder, a barcode scanner, an RFID reader, a digital camera, a handheld video game console, a calculator, and any other handheld electronic device, portable electronic device, or stationary electronic device that uses active cooling solutions to dissipate heat.

Further, it should be appreciated that using photovoltaic cells to capture infrared energy from electronic components may be most efficient and effective when the components are packaged in a relatively small area. However, the photovoltaic cells may be used for electronic components that are not packaged in a relatively small area in any portable electronic device to prolong the battery life and/or cool the device.

Figure 3:
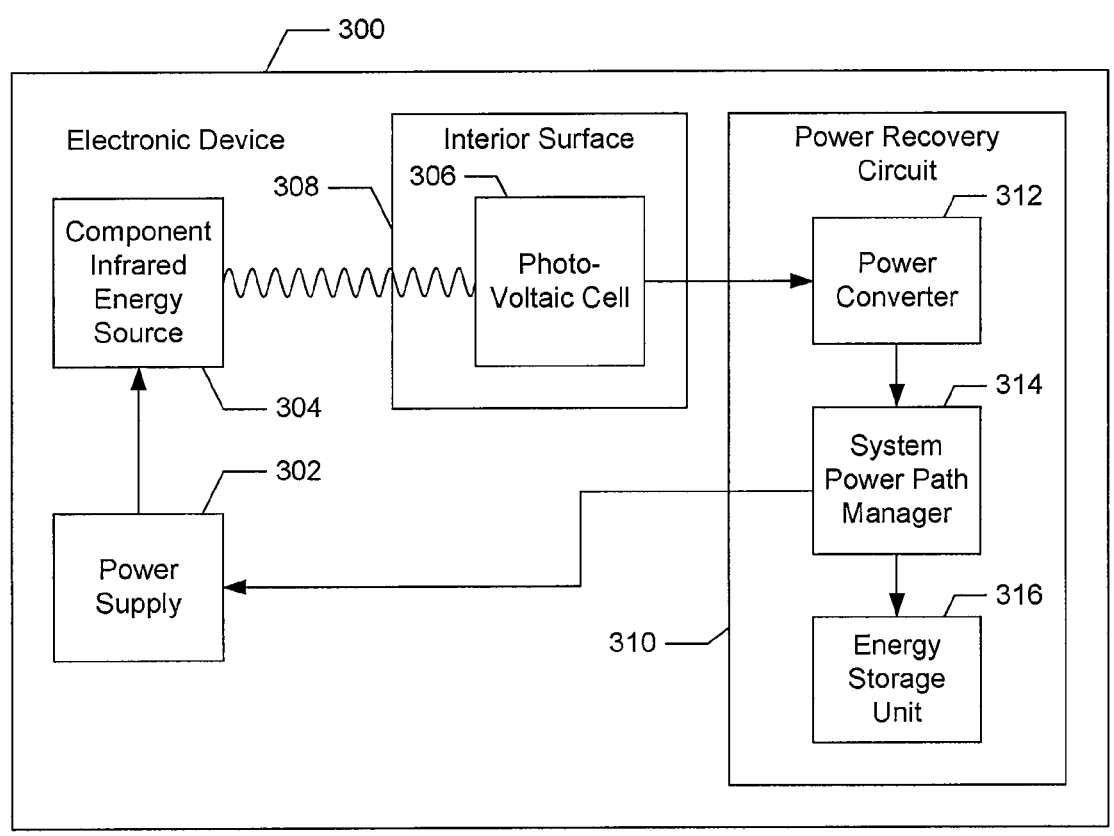
FIG. 3 is a high level block diagram of an example embodiment of an apparatus for cooling and energy capture in an electronic device using photovoltaics.

FIG. 3 is a high level block diagram of an example embodiment of an apparatus for cooling and energy capture in an electronic device 300 using photovoltaics. A power supply 302 provides power to one or more electronic components of the device 300. An electronic component 304 is an infrared energy source, because the component 304 uses the power from the power supply 302 to perform a function, and in the process of using said power, the component 304 generates heat and infrared energy. In an example embodiment, the component 304 may be a microprocessor, which is a system load that consumes power to perform functions and generates heat and infrared energy, which are then radiated from the microprocessor into the surrounding environment. It should be appreciated that heat may radiate from an electronic component 304 to the surrounding environment in various ways. For example, heat may travel from a heat source by heat convection, heat conduction, and/or infrared energy radiation. The portable electronic device 300 may include multiple electronic components 304 that are each a system load using power to perform some function, thus, generating and radiating heat and infrared energy. For a portable electronic device 300, the number of system loads consuming power at any given time may need to be managed, taking into account the amount of power being consumed by all of the system loads.

In the example embodiment illustrated in FIG. 3, a photovoltaic cell 306 is affixed to an interior surface 308 of the electronic device 300, such as a housing wall of the device 300. The photovoltaic cell 306 absorbs infrared energy that is radiated into the photovoltaic cell 306. When the organic photovoltaic cell 306 absorbs infrared energy, the level of heat in the electronic device 300 caused by the infrared energy is decreased. In an example embodiment, the photovoltaic cell 306 may be situated in close proximity to the component infrared energy source 304 to maximize the amount of infrared energy that is absorbed by the photovoltaic cell 306. The size of the photovoltaic cell 306 may be specifically adapted to the size and shape of the interior surface 308 or may be a different size and shape to maximize the efficiency of the photovoltaic cell 306. In an example embodiment, the photovoltaic cell 306 may be situated in an area of the portable electronic device 300 that may be prone to hot spots or an area that is relatively difficult to cool through heat distribution techniques. For example, the photovoltaic cell 306 may be located where numerous components 304 that produce infrared energy and heat are packaged tightly into a relatively small area. It should be appreciated that various techniques of configuring photovoltaic cells 306 may be used in an manner customized to each electronic device to maximize cooling.

In the example embodiment illustrated in FIG. 3, the photovoltaic cell 306 converts the absorbed infrared energy into an electric current. Typically, a photovoltaic cell may output a relatively high current at a relatively low voltage, however, a plurality of photovoltaic cells may produce a relatively high voltage. In the example embodiment illustrated in FIG. 3, the output current from the photovoltaic cell 306 is provided to a power recovery circuit 310 to condition the electric current, which allows the infrared energy to be recaptured and easily useable by the electronic device 300. The example power recovery circuit 310 includes a power converter 312 that takes in the electric current from the organic photovoltaic cell 306 and conditions it into a conditioned power signal. In an example embodiment, the power converter 312 may be a boost converter that steps up the voltage while stepping down the current to create a conditioned power signal. The example boost converter may be a high efficiency boost converter, which can increase efficiency of the power recovery circuit 310. The power recovery circuit 310 uses the power converter to condition the output signal of the photovoltaic cell 306 into a power signal suited for use by the system power path manager 314. The system power path manager 314 determines how to use the conditioned power signal. The system power path manager 314 can provide the conditioned power signal to an energy storage unit 316, for example, a rechargeable battery. Also, the system power path manager 314 can provide the conditioned power signal to the power supply 302, thus, reusing the energy captured by the power recovery circuit 310. In an example embodiment, the system power path manager 314 may provide the conditioned power signal to the power supply 302 when the system is drawing a high level of power, and provide the conditioned power signal to the energy storage unit 316 when the system is drawing a low level of power. It should be appreciated that various configurations may be used to maximize energy capture efficiency, based on the particular electronic components 304 used in an electronic device 300, the battery recharge characteristics, etc.

Figure 4:
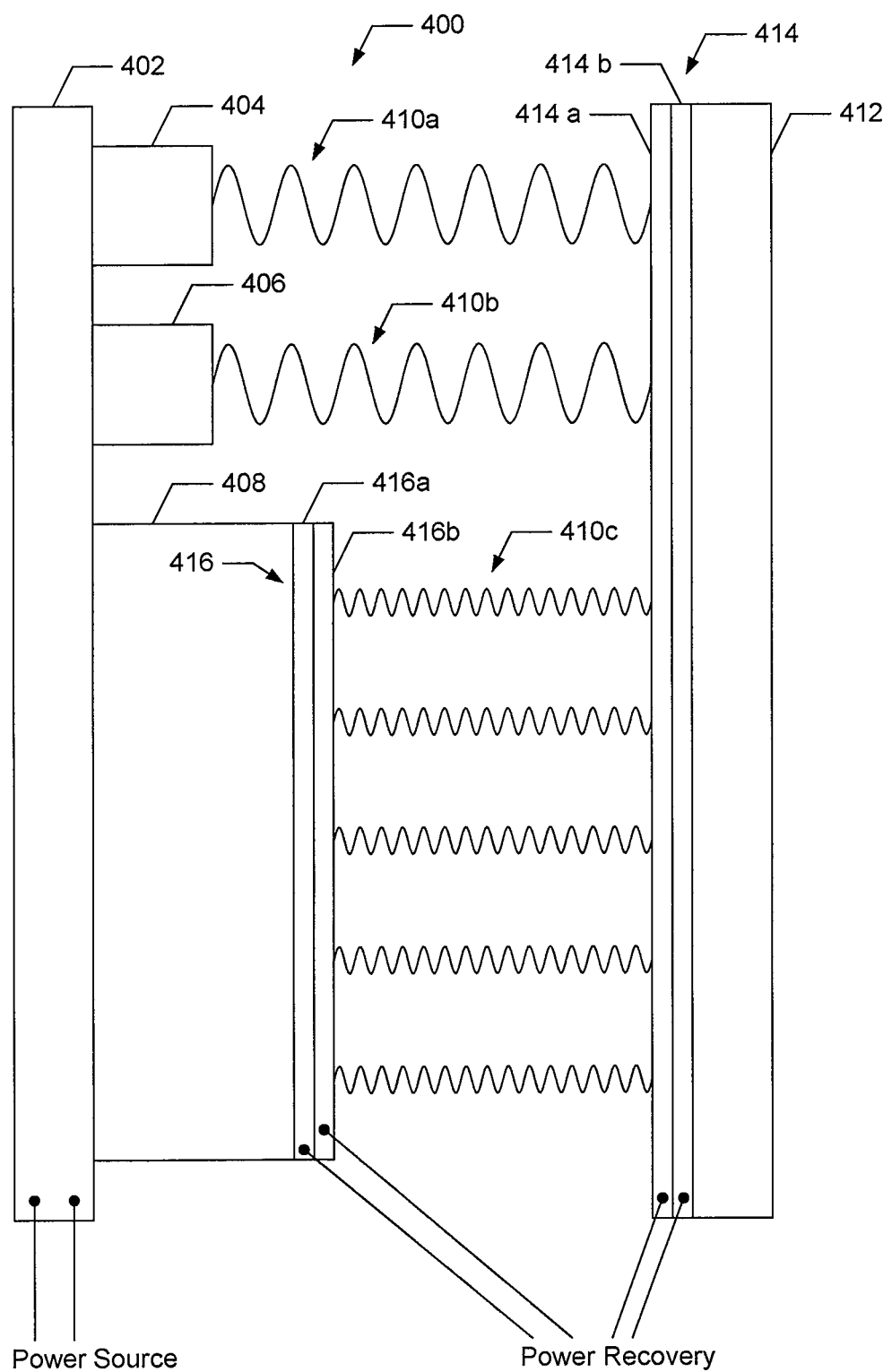
FIG. 4 is a block diagram of an example embodiment of an apparatus for cooling and energy capture in an electronic device using photovoltaics.

FIG. 4 is a block diagram of an example embodiment of an apparatus for cooling and energy capture in an electronic device 400 using photovoltaics. A circuit board 402 receives a power signal from a power source to power electronic components 404, 406, and 408. In an example embodiment, the circuit board 402 may include a wide variety of electronic components, including components such as a microprocessor, an amplifier, a voltage regulator, a converter, a transformer, a rectifier, a transistor, a diode, a resistor, a capacitor, an inductor, transmitter, a receiver, a display, a battery, a speaker, and/or an integrated circuit.

In an example embodiment, the electronic component 404 is a power amplifier mounted on the circuit board 402. The electronic component 404 is powered by the power source and generates heat and infrared energy. The generated heat and infrared energy radiate away from the electronic component 404 in various directions. Similarly, the electronic component 406 is a rectifier mounted on the circuit board 402 that is powered by the power source and generates and radiates heat and infrared energy into the electronic device 400. The electronic component 408 is a microprocessor mounted on the circuit board 402 that is powered by the power source. The example electronic component 408 may produce a particularly high concentration of heat and infrared energy. The infrared energy 410 is represented by the energy waves designated as reference numbers 410a, 410b, and 410c. The infrared energy 410a is radiated from electronic component 404, the infrared energy 410b is radiated from electronic component 406, and the infrared energy 410c is radiated from electronic component 408.

The electronic device 400 includes a housing wall 412, which in an example embodiment is an opaque plastic. The housing wall 412, would typically be directly exposed to the radiated infrared energy 410, however, an organic photovoltaic cell 414 is located on the housing wall 412. Accordingly, a reduced amount of infrared energy 410 will reach the housing wall 412 because a portion of the infrared energy 410 is absorbed by the organic photovoltaic cell 414 and converted into an electric current which is used for power recovery. In the example embodiment illustrated in FIG. 4, organic photovoltaic cell 414 includes two portions, a cathode 414a and an anode 414b. The cathode 414a and the anode 414b are applied, for example, as a paint to the housing wall 412, and coupled together form the organic photovoltaic cell 414. Also, an organic photovoltaic cell 416 is applied to electronic component 408, which produces a high level of infrared energy. For example, the organic photovoltaic cell 416 is applied as a paint with a cathode 416a and an anode 416b, which coupled together provide the photovoltaic effect desired. In the example embodiment illustrated in FIG. 4, the infrared energy radiating away from electronic component 408 has a lower energy level per unit of area than the electronic components 404 and 406. The organic photovoltaic cell 416 has absorbed a portion of the infrared energy radiated from electronic component 408, leaving the resulting infrared energy 410c radiating towards the housing wall 412 at a decreased level. It should be appreciated that multiple layers of photovoltaic cells may be used between a source of infrared energy 410 and another object such as a housing wall 412 or another electronic component 404, 406, 408. Further, it should be appreciated that photovoltaics cells may take different forms depending on the application, such as a flexible photovoltaic film that can be custom shaped, spray on photovoltaic materials, etc.

Accordingly, because a portion of the infrared energy represented as 410a, 410b, and 410c does not reach the housing wall 412, the level of heat at the housing wall 412 is decreased. The actual amount of infrared energy 410 which is absorbed by the organic photovoltaic cells 414 and 416, and the resulting amount of infrared energy 410 that reached the housing wall 412, depends on various factors including the efficiency of the organic photovoltaic cells 414 and 416. Generally, as the efficiency and effectiveness of the organic photovoltaic cells 414 and 416 increases, the overall amount of cooling increases and the resulting heat at the housing wall 412 decreases, and the amount of energy available to be captured via power recovery increases.

It should be appreciated that certain electronic components may produce particularly high levels of heat and infrared energy, for example, a central processor, an RF power amplifier, a power management unit and/or a battery charger such as a inductive charging system, which may include a half-transformer coil and rectifier. Accordingly, use of photovoltaics cell for cooling and energy capture may be primarily based on the targeting capturing heat and infrared energy from these high energy sources.

Further, it should be appreciated that different photovoltaic cells may be optimized to absorb different frequency ranges of energy. For example, a first photovoltaic cell may be optimized to absorb energy of a lower frequency and a second photovoltaic cell energy of a higher frequency, allowing the first and second photovoltaic cells to be used in serial fashion, which may be more efficient when dealing with certain infrared energy sources than using a photovoltaic cell that absorbs a wide range of frequencies.

Figure 5:
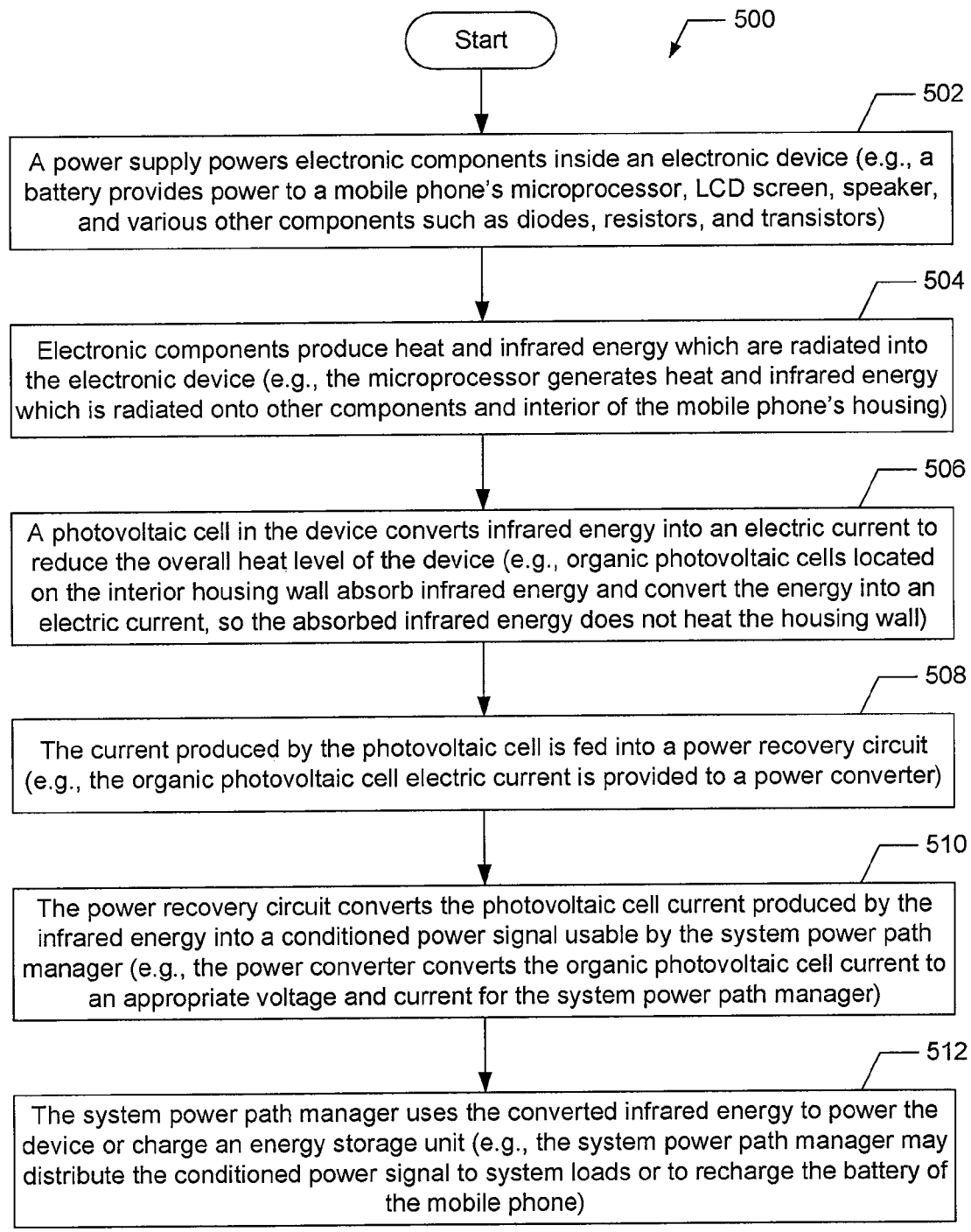
FIG. 5 is a flowchart of an example method of cooling and energy capture in an electronic device using photovoltaics.

FIG. 5 is a flowchart of an example cooling and energy capture process 500. Although the cooling and energy capture process 500 is described with reference to the flowchart illustrated in FIG. 5, it will be appreciated that many other methods of performing the acts associated with the example cooling and energy capture process 500 may be used. For example, the order of some of the blocks may be changed, and some of the blocks described are optional.

The example cooling and energy capture process 500 begins with a power supply powering electronic components inside an electronic device (block 502). For example, a battery provides power to a mobile phone's microprocessor, LCD screen, speaker, and various other components such as diodes, resistors, and transistors. When electronic components in the electronic device are powered, the electronic components produce heat and infrared energy which are radiated into the electronic device (block 504). For example, the microprocessor generates heat and infrared energy which is radiated onto other components and the interior of the mobile phone's housing. When heat and infrared energy which are radiated into the electronic device, a photovoltaic cell in the device converts infrared energy into an electric current to reduce the overall heat level of the device (block 506). For example, organic photovoltaic cells located on the interior housing wall absorb infrared energy and convert the energy into an electric current, so the absorbed infrared energy does not heat the housing wall. Next, the current produced by the photovoltaic cell is fed into a power recovery circuit (block 508). For example, the organic photovoltaic cell electric current is provided to a power converter. When the power converter receives the electric current from the organic photovoltaic cell, the power recovery circuit converts the organic photovoltaic cell current produced by the infrared energy into conditioned power signal usable by the system power path manager (block 510). For example, the power converter converts the organic photovoltaic cell current to an appropriate voltage and current for the system power path manager. Next, the system power path manager uses the converted infrared energy to power the portable electronic device or to charge an energy storage unit (block 512). For example, the system power path manager may distribute the conditioned power signal to system loads or to recharge the battery of the mobile phone.

Accordingly, using the example cooling and energy capture process 500 allows an electronic device to recover energy which would otherwise be lost in the form of heat and infrared energy and also cool the electronic components of the device. Using the example cooling and energy capture process 500 may improve various aspects of an electronic device, which may allow the device to provide a better user experience and/or make the device cheaper and easier to design and manufacture. For example, the cooling and energy capture process 500 may allow for increased battery life; a smaller, more lightweight, and/or more cost effective battery; a more compact and user friendly design; increased protection from hot spots or warm areas; increased component operating speed; less expensive components which do not require throttle down capabilities; reducing or eliminating active cooling devices; cheaper or simpler passive cooling devices; a simpler and quicker design process; a lower design cost; increased overall energy efficiency; lower power consumption and/or recharging costs from a power grid; and/or increased overall device performance.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus for cooling and energy capture in an electronic device, comprising:
    an energy storage unit located in the electronic device;
    a power supply located in the electronic device, the power supply configured to receive a power signal from the energy storage unit;
    a first electronic component located in an interior cavity of the electronic device and to receive the power signal from the power supply, the first electronic component configured to consume power as a first system load, generate heat and infrared energy, and radiate the heat and infrared energy into the electronic device;
    a photovoltaic cell affixed to an interior surface of the electronic device and positioned to face the first electronic component and to absorb radiated infrared energy from the first electronic component, the photovoltaic cell configured to cool the electronic device by absorbing at least a portion of the radiated infrared energy generated by the first electronic component and converting the absorbed radiated infrared energy into an electric current; and
    a power recovery circuit located in the electronic device, the power recovery circuit configured to receive the electric current from the photovoltaic cell and to condition the electric current to provide a conditioned power signal to at least one of the energy storage unit and the first electronic component.

2. The apparatus of claim 1, wherein the electronic device is a portable electronic device.

3. The apparatus of claim 1, wherein the energy storage unit is a rechargeable battery.

4. The apparatus of claim 1, wherein the first electronic component includes at least one of a microprocessor, an amplifier, a voltage regulator, a converter, a transformer, a rectifier, a transistor, a diode, a resistor, a capacitor, an inductor, transmitter, a receiver, a display, a battery, a speaker, and an integrated circuit.

5. The apparatus of claim 1, wherein the photovoltaic cell is part of a at least one of a photovoltaic cell module, a photovoltaic cell array, and a plurality of photovoltaic cells.

6. The apparatus of claim 1, wherein the photovoltaic cell is optimized to absorb radiated energy in the infrared frequency range.

7. The apparatus of claim 1, wherein the photovoltaic cell absorbs radiated energy from the infrared frequency range and at least one of the visible light frequency range, the ultraviolet frequency range, the microwave frequency range, the radio frequency range, and the x-ray frequency range.

8. The apparatus of claim 1, wherein the photovoltaic cell is an organic photovoltaic cell.

9. The apparatus of claim 8, wherein the organic photovoltaic cell is applied to a surface by painting a cathode material and an anode material onto the surface.

10. The apparatus of claim 9, wherein the organic photovoltaic cell is applied to at least one of an interior portion of a housing wall of the portable electronic device and a surface of first component.

11. The apparatus of claim 1, wherein the power recovery circuit includes a boost converter to condition the energy received from the photovoltaic cell into the conditioned power signal in a specified current range and in a specified voltage range.

12. A method for cooling and energy capture in a portable electronic device, comprising:
providing power to a first electronic component, the first electronic component consuming power as a first system load located in the portable electronic device;
generating heat and infrared energy in the first electronic component;
radiating the heat and the infrared energy from the first electronic component within an interior cavity of the portable electronic device;
absorbing at least a portion of the radiated infrared energy with a photovoltaic cell, the photovoltaic cell located within the portable electronic device and positioned to face the first electronic component and to absorb radiated infrared energy from the first electronic component;
converting the absorbed radiated infrared energy into an electric current with the photovoltaic cell;
receiving the electric current from the photovoltaic cell at a power recovery circuit located in the portable electronic device;
conditioning the electric current with the power recovery circuit; and
providing the conditioned electric current to at least one of an energy storage unit, the first electronic component, and a second electronic component, the second electronic component consuming power as a second system load located in the portable electronic device.

13. The method of claim 12, wherein the energy storage unit is a rechargeable battery.

14. The method of claim 12, wherein the electronic device is a portable electronic device.

15. The method of claim 12, wherein the first electronic component includes at least one of a microprocessor, an amplifier, a voltage regulator, a converter, a transformer, a rectifier, a transistor, a diode, a resistor, a capacitor, an inductor, transmitter, a receiver, a display, a battery, a speaker, and an integrated circuit.

16. The method of claim 12, wherein the photovoltaic cell is part of a at least one of a photovoltaic cell module, a photovoltaic cell array, and a plurality of photovoltaic cells.

17. The method of claim 12, wherein the photovoltaic cell is optimized to absorb radiated energy in the infrared frequency range.

18. The method of claim 12, wherein the photovoltaic cell absorbs radiated energy from the infrared frequency range and at least one of the visible light frequency range, the ultraviolet frequency range, the microwave frequency range, the radio frequency range, and the x-ray frequency range.

19. The method of claim 12, wherein the photovoltaic cell is an organic photovoltaic cell.

20. The method of claim 19, wherein the organic photovoltaic cell is applied to a surface by painting a cathode material and an anode material onto the surface.

21. The method of claim 20, wherein the organic photovoltaic cell is applied to at least one of an interior portion of a housing wall of the portable electronic device and a surface of first component.

22. The method of claim 12, wherein the power recovery circuit includes a high efficiency boost converter to condition the energy received from the photovoltaic cell into the conditioned power signal in a specified current range and in a specified voltage range.

23. The apparatus of claim 1, the amount of radiated infrared energy to reach a housing wall of the device is reduced by the portion of the absorbed infrared energy.

24. The apparatus of claim 1, the photovoltaic cell to absorb a first frequency range of radiated energy and a second photovoltaic cell to absorb a second frequency range of radiated energy, the first range is distinct from the second range.

* * * * *